US012647021B2

(12) United States Patent
Liu et al.

(10) Patent No.: US 12,647,021 B2
(45) Date of Patent: Jun. 2, 2026

(54) PRE-BIAS VOLTAGE CONTROL CIRCUIT AND METHOD THEREOF

(71) Applicant: RICHTEK TECHNOLOGY CORP., Hsinchu County (TW)

(72) Inventors: Kuo-Chi Liu, Hsinchu City (TW); Ta-Yung Yang, Taoyuan City (TW); Chang-Yu Ho, Hsinchu County (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 227 days.

(21) Appl. No.: 18/641,461

(22) Filed: Apr. 22, 2024

(65) Prior Publication Data

US 2025/0158513 A1 May 15, 2025

Related U.S. Application Data

(60) Provisional application No. 63/599,537, filed on Nov. 15, 2023.

(51) Int. Cl.
| | |
|---|---|
| *H02M 1/36* | (2007.01) |
| *H02M 1/08* | (2006.01) |
| *H02M 3/07* | (2006.01) |
| *H02M 3/158* | (2006.01) |

(Continued)

(52) U.S. Cl.
CPC ............... *H02M 1/36* (2013.01); *H02M 1/08* (2013.01); *H02M 3/07* (2013.01); *H02M 3/158* (2013.01); *H02M 1/32* (2013.01); *H02M 7/4837* (2021.05)

(58) Field of Classification Search
CPC ............ H02M 1/36; H02M 1/08; H02M 3/07; H02M 3/158; H02M 1/32; H02M 7/4837
See application file for complete search history.

(56) References Cited

U.S. PATENT DOCUMENTS

| | | | |
|---|---|---|---|
| 2016/0329810 A1* | 11/2016 | Lee ......................... | H02M 3/07 |
| 2018/0234011 A1 | 8/2018 | Muramatsu | |

(Continued)

OTHER PUBLICATIONS

Yousefzadeh , "Three-level buck converter for envelope tracking in RF power amplifiers," Twentieth Annual IEEE Applied Power Electronics Conference and Exposition, 2005.

(Continued)

*Primary Examiner* — Lakaisha Jackson
(74) *Attorney, Agent, or Firm* — Winston Hsu

(57) ABSTRACT

A pre-bias voltage control circuit includes a flying capacitor, a voltage sensor, and a voltage controlled current source. The voltage sensor is used to generate a sensed capacitor voltage according to a capacitor voltage across the flying capacitor, and includes an inverting input terminal coupled to the flying capacitor, a non-inverting input terminal coupled to the flying capacitor, and an output terminal for outputting the sensed capacitor voltage. The voltage controlled current source is used to charge and discharge the flying capacitor, and includes a reference terminal for receiving a reference voltage, an input terminal coupled to the output terminal of the voltage sensor, a current output terminal coupled to the flying capacitor, and a current return terminal coupled to the flying capacitor. The voltage controlled current source generates a source current to charge the flying capacitor when the sensed capacitor voltage falls below the reference voltage.

20 Claims, 16 Drawing Sheets

(51) Int. Cl.
  *H02M 1/32*          (2007.01)
  *H02M 7/483*         (2007.01)

(56)                    References Cited

U.S. PATENT DOCUMENTS

| | | | | |
|---|---|---|---|---|
| 2019/0379287 | A1* | 12/2019 | Zhang | H02M 3/07 |
| 2021/0096160 | A1* | 4/2021 | Omole | G01R 19/165 |

OTHER PUBLICATIONS

Li , "A Novel Hybrid 4:1 Step Down Converter Using an Auto-transformer with DC Winding Current," 2020 IEEE Energy Conversion Congress and Exposition (ECCE).

\* cited by examiner

800

Vin

R1

Vref1

R2

Vref2

R3

830

840

820

Vcs

CS1

SW1

SW2

CS2

810

Vc

CS3

SW3

SW4

CS4

1500

1502

Generate a sensed capacitor voltage
according to a capacitor voltage across
the flying capacitor

1504

Compare the sensed capacitor voltage
with a reference voltage to generate a
difference voltage

1506

Generate a source current or a sink
current according to the difference voltage

1600

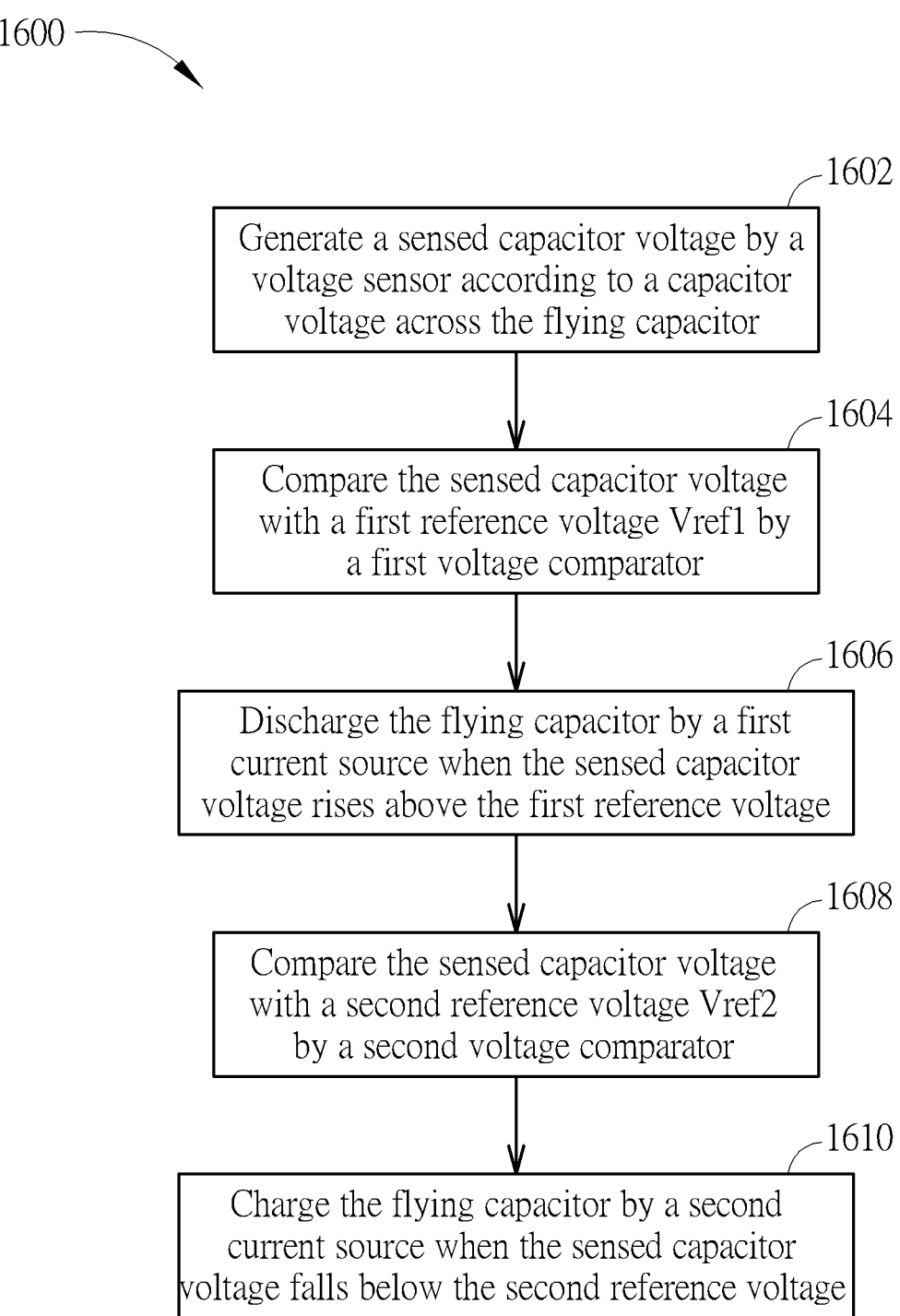

1602

Generate a sensed capacitor voltage by a voltage sensor according to a capacitor voltage across the flying capacitor

1604

Compare the sensed capacitor voltage with a first reference voltage Vref1 by a first voltage comparator

1606

Discharge the flying capacitor by a first current source when the sensed capacitor voltage rises above the first reference voltage

1608

Compare the sensed capacitor voltage with a second reference voltage Vref2 by a second voltage comparator

1610

Charge the flying capacitor by a second current source when the sensed capacitor voltage falls below the second reference voltage

FIG. 16

PRE-BIAS VOLTAGE CONTROL CIRCUIT AND METHOD THEREOF

CROSS REFERENCE TO RELATED APPLICATIONS

This application claims the benefit of U.S. Provisional Application No. 63/599,537, filed on Nov. 15, 2023. The content of the application is incorporated herein by reference.

BACKGROUND OF THE INVENTION

1. Field of the Invention

The present invention relates to circuits, and more particularly to a pre-bias voltage control circuit and method thereof.

2. Description of the Prior Art

A buck converter, also known as a step-down converter, is a DC-to-DC power converter that steps down the input voltage to a lower output voltage. It is widely used in various electronic devices and systems to regulate and provide the desired voltage level required by the load. The basic principle of a buck converter is to control the on and off times of a switching element, typically a transistor, in order to transfer energy from the input source to the output load. The converter operates by rapidly switching the transistor on and off, allowing the input current to charge an inductor when the transistor is on, and then transferring the stored energy from the inductor to the output capacitor and load when the transistor is off.

The main components of a buck converter are one or more power switches (transistors), inductors, output capacitors, diodes, and control circuits. The switches control the on and off time of the converter. The inductor stores energy during the on-time of the switching element and releases it during the off-time. The output capacitor filters the pulsating output from the inductor, providing a smooth DC output voltage. The diode allows the inductor current to flow to the output when the switching element is off. The control circuit generates the switching signal for the transistor, typically using pulse-width modulation (PWM) to regulate the output voltage. The output voltage of a buck converter is controlled by adjusting the duty cycle of the switching signal. A higher duty cycle (longer on-time) results in a higher output voltage, while a lower duty cycle (shorter on-time) results in a lower output voltage.

Buck converters are highly efficient and compact, making them widely used in various applications such as power supplies for electronic devices (laptops, smartphones, etc.), voltage regulation in power distribution systems, automotive electronics, portable and battery-powered equipment, and telecommunications equipment.

The above described power converters, particularly in high-power applications, necessitate measures to restrict inrush current. Some proposed solutions include "Three-level Buck Converter for Envelope Tracking in RF Power Amplifiers" published in 2005 IEEE Applied Power Electronics Conference and Exposition, and "A Novel Hybrid 4:1 Step Down Converter Using an Autotransformer with DC Winding Current" publish in 2020 IEEE Energy Conversion Congress and Exposition (ECCE). However, it is still necessary to come out with a more advantageous solution that can mitigate the inrush current problem and reduce voltage stress on switches or transistors.

SUMMARY OF THE INVENTION

An embodiment provides a pre-bias voltage control circuit including a flying capacitor, a voltage sensor, and a voltage controlled current source. The voltage sensor is used to generate a sensed capacitor voltage according to a capacitor voltage across the flying capacitor, and includes an inverting input terminal coupled to the flying capacitor, a non-inverting input terminal coupled to the flying capacitor, and an output terminal for outputting the sensed capacitor voltage. The voltage controlled current source is used to charge and discharge the flying capacitor, and includes a reference terminal for receiving a reference voltage, an input terminal coupled to the output terminal of the voltage sensor, a current output terminal coupled to the flying capacitor, and a current return terminal coupled to the flying capacitor. The voltage controlled current source generates a source current to charge the flying capacitor when the sensed capacitor voltage falls below the reference voltage. The voltage controlled current source generates a sink current to discharge the flying capacitor when the sensed capacitor voltage rises above the reference voltage.

Another embodiment provides a pre-bias voltage control circuit including a first switch, a second switch, a third switch and a fourth switch, a first current source coupled to the first switch, a second current source coupled between the second switch and a ground, a third current source coupled to the third switch, a fourth current source coupled between the fourth switch and the ground, a flying capacitor coupled to the first switch and the third switch, a voltage sensor, a first voltage comparator, and a second voltage comparator. The voltage sensor is used to generate a sensed capacitor voltage according to a capacitor voltage difference across the flying capacitor, and includes an inverting input terminal coupled to the flying capacitor, a non-inverting input terminal coupled to the flying capacitor, and an output terminal for outputting the sensed capacitor voltage. The first voltage comparator is used to compare the sensed capacitor voltage with a first reference voltage, and includes an inverting input terminal for receiving the first reference voltage, a non-inverting input terminal coupled to the output terminal of the voltage sensor, and an output terminal coupled to the second switch and the third switch. The second voltage comparator is used to compare the sensed capacitor voltage with a second reference voltage, and includes an inverting input terminal coupled to the output terminal of the voltage sensor, a non-inverting input terminal for receiving the second reference voltage, and an output terminal coupled to the first switch and the fourth switch. When the sensed capacitor voltage rises above the first reference voltage, the second current source and the third current source discharge the flying capacitor. When the sensed capacitor voltage falls below the second reference voltage, the first current source and the fourth current source charge the flying capacitor. When the sensed capacitor voltage is between the first reference voltage and the second reference voltage, the first comparator and the second comparator disable the first current source, the second current source, the third current source and the fourth current source.

An embodiment provides a method for biasing a flying capacitor using a pre-bias voltage control circuit. The pre-bias voltage control circuit includes the flying capacitor, a voltage sensor, and a voltage controlled current source. The voltage sensor includes an inverting input terminal coupled to the flying capacitor, a non-inverting input terminal coupled to the flying capacitor, and an output terminal. The voltage controlled current source includes a reference terminal, an input terminal coupled to the output terminal of the voltage sensor, a current output terminal coupled to the flying capacitor, and a current return terminal coupled to the flying capacitor. The method includes generating a sensed capacitor voltage according to a capacitor voltage across the flying capacitor, comparing the sensed capacitor voltage with a reference voltage to generate a difference voltage, and generating a source current or a sink current according to the difference voltage. A magnitude of the source current or the sink current is directly proportional to the difference voltage.

An embodiment provides a method for biasing a flying capacitor. The method includes generating a sensed capacitor voltage by a voltage sensor according to a capacitor voltage across the flying capacitor, comparing the sensed capacitor voltage with a first reference voltage by a first voltage comparator, and discharging the flying capacitor by a first current source when the sensed capacitor voltage rises above the first reference voltage, comparing the sensed capacitor voltage with a second reference voltage, and charging the flying capacitor by a second current source when the sensed capacitor voltage falls below the second reference voltage.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 16 depicts a flowchart of a method for biasing a flying capacitor using the pre-bias voltage control circuit of FIG. 8.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. In this specification, technical features that are individually described within one drawing may be implemented individually or simultaneously.

Figure 1:
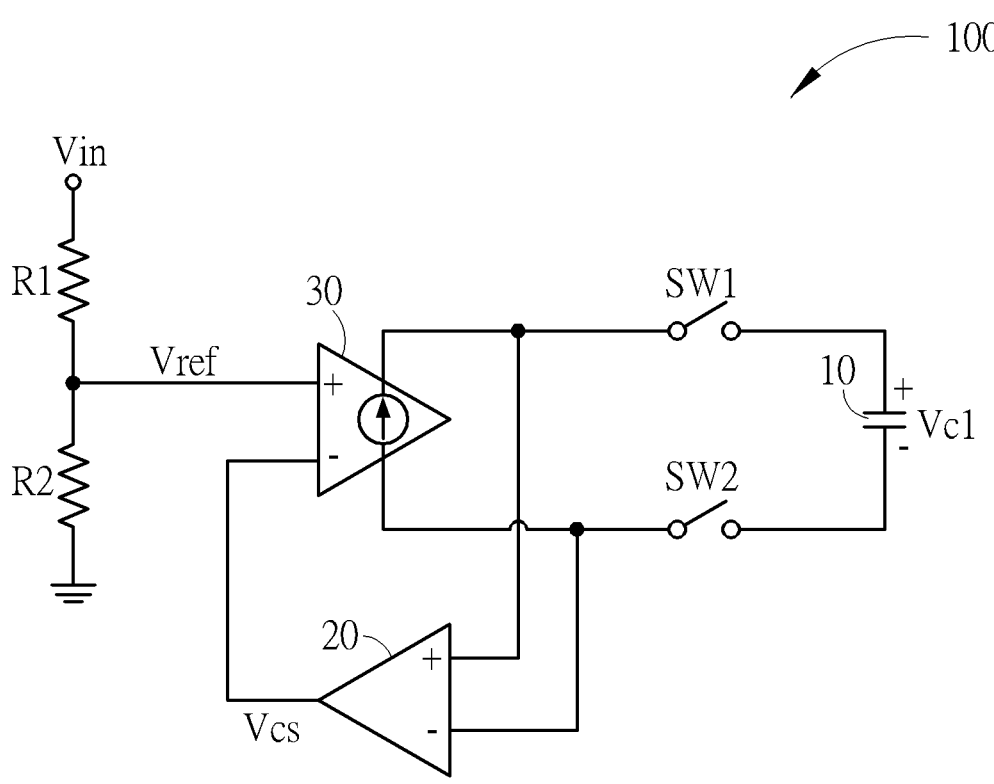
FIG. 1 depicts an embodiment of a pre-bias voltage control circuit.

FIG. 1 depicts an embodiment of a pre-bias voltage control circuit 100. The pre-bias voltage control circuit 100 includes a flying capacitor 10, a voltage sensor 20, and a voltage controlled current source (VCCS) 30. The voltage sensor 20 is used to generate a sensed capacitor voltage Vcs according to a capacitor voltage Vc across the flying capacitor 10. The voltage sensor 20 includes an inverting input terminal coupled to the one end of flying capacitor 10, a non-inverting input terminal coupled to the other end of flying capacitor 10, and an output terminal for outputting the sensed capacitor voltage Vcs. The voltage controlled current source 30 is used to charge and discharge the flying capacitor 10. The voltage controlled current source 30 includes a reference terminal for receiving a reference voltage Vref, an input terminal coupled to the output terminal of the voltage sensor 20, a current output terminal coupled to one end of the flying capacitor 10, and a current return terminal coupled to the other end of the flying capacitor 10. The voltage sensor 20 may include an operational amplifier, an error amplifier or the equivalent thereof.

Furthermore, the voltage controlled current source 30 generates a source current to charge the flying capacitor 10 when the sensed capacitor voltage Vcs falls below the reference voltage Vref. The voltage controlled current source 30 generates a sink current to discharge the flying capacitor 10 when the sensed capacitor voltage Vcs rises above the reference voltage Vref.

Optionally, as illustrated in FIG. 1, the pre-bias voltage control circuit 100 can further include a first switch SW1 coupled between the non-inverting terminal and the flying capacitor 10, and a second switch SW2 coupled between the inverting terminal and the flying capacitor 10. During the pre-charge cycle for the flying capacitor 10, the switches SW1 and SW2 can be activated. Upon completion of the pre-charge cycle (the capacitor voltage Vc reaches the desired pre-bias voltage), the switches SW1 and SW2 can be deactivated.

Optionally, as illustrated in FIG. 1, the pre-bias voltage control circuit 100 can further include a resistive voltage divider, formed by resistors R1 and R2, coupled across the input voltage Vin of a power converter. The resistive voltage divider generates the reference voltage Vref that is a fraction of Vin. By selecting the appropriate resistance ratio of the resistors R1 and R2, the reference voltage Vref can be set to a specific value, such as half of the input voltage Vin.

Figure 2:
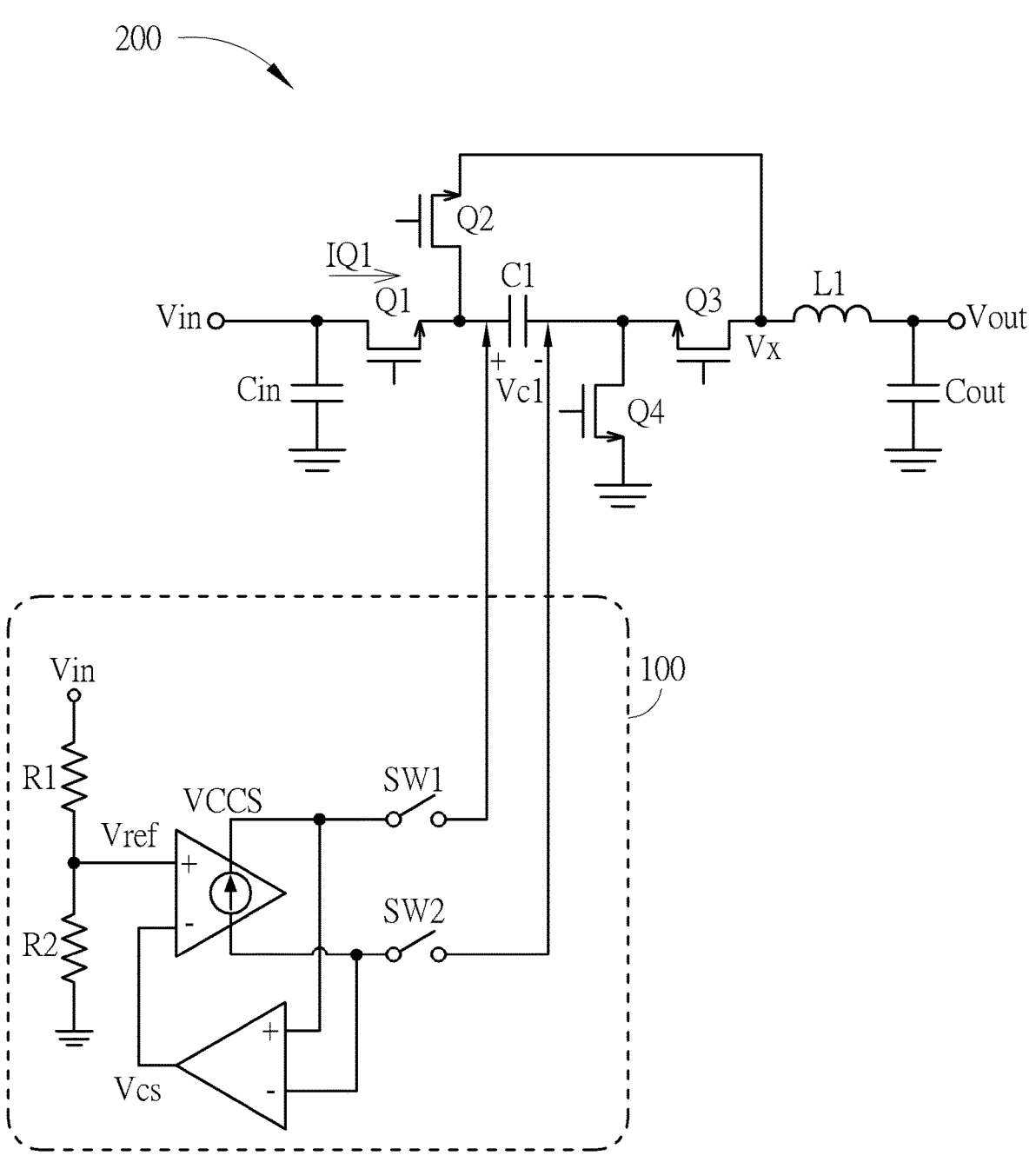
FIG. 2 depicts an application of the pre-bias voltage control circuit of FIG. 1 to a power converter.

FIG. 2 depicts an application of the pre-bias voltage control circuit 100 to a power converter 200. The power converter 200 shows a hybrid switched-capacitor converter. This converter uses four switches Q1-Q4 and an output capacitor Cout to generate the desired output voltage. An inductor L1 is coupled between the output capacitor and the switches Q1-Q4 to regulate the power flow. To reduce voltage stress across the switches Q1-Q4, a flying capacitor C1 is incorporated into the circuit and functions as a voltage divider.

The power converter 200 can be described in further details. An input capacitor Cin can be coupled between an input terminal and the ground. The switch Q1 can be coupled between the flying capacitor C1 and the input capacitor Cin. The switch Q4 can be coupled between the flying capacitor C1 and the ground. The switch Q3 can be coupled between the inductor L1 and the switch Q4. A first terminal of the switch Q2 can be coupled to the switch Q1 and a second terminal of the switch Q2 can be coupled to the switch Q3. The output capacitor Cout can be coupled between the output terminal and the ground. The switches Q1-Q4 can be implemented by suitable transistors.

The pre-bias voltage control circuit 100 manages the flying capacitor C1. The control circuit 100 employs the voltage controlled current source 30 to adjust the charge on the flying capacitor C1. The voltage controlled current source 30 operates based on the difference between the reference voltage Vref and the voltage Vc1 sensed from the flying capacitor C1 by the voltage sensor 20.

Figure 3B:
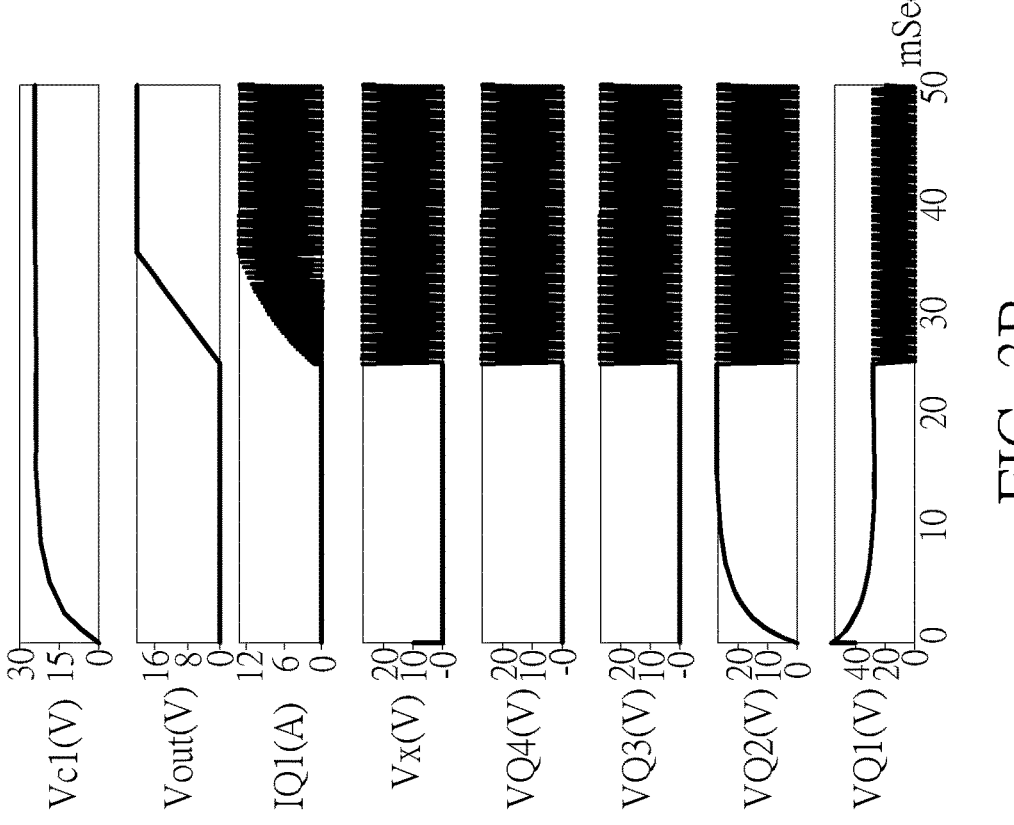
FIG. 3A and FIG. 3B depict simulation waveforms of the various voltages and currents in the power converter of FIG. 2.
Figure 3A:
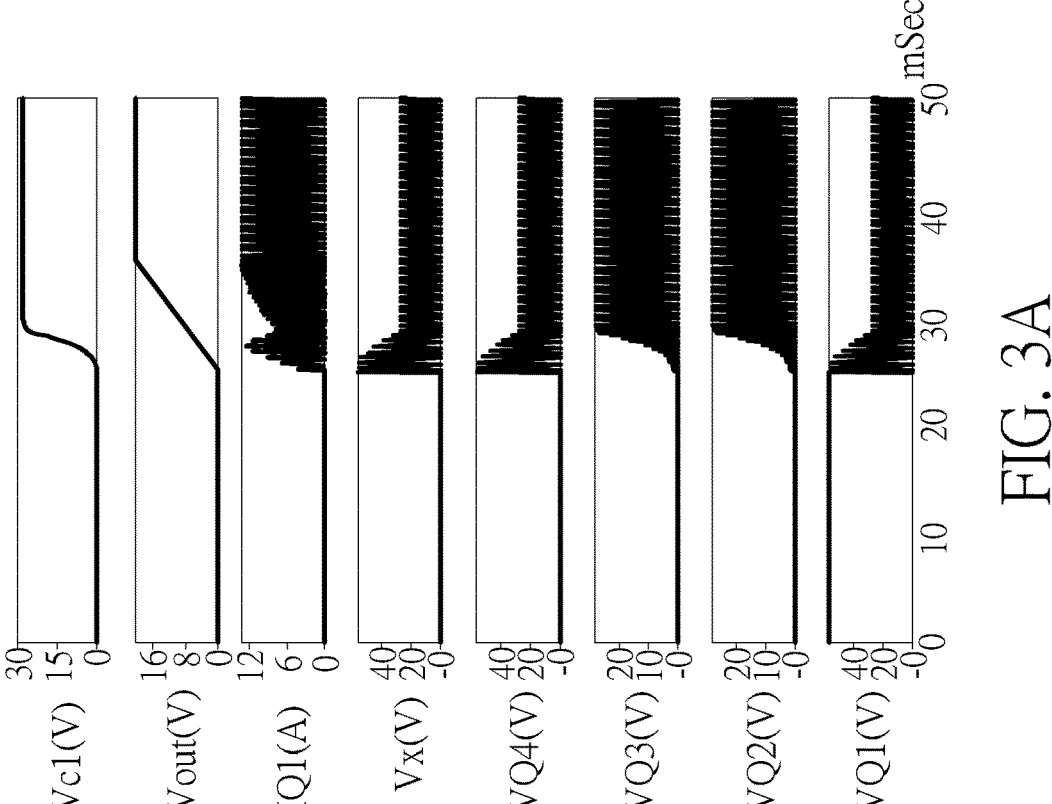

FIGS. 3A and 3B depict simulation waveforms of the various voltages and currents in the power converter 200. The vertical axes show voltage values in volts (V) or current values in amps (A). The horizontal axes represent time in milliseconds (ms). The input voltage for the simulation is set at 54 V. Vc1 represents the voltage across the flying capacitor C1. IQ1 represents the operation current of the switch Q1. VQ1, VQ2, VQ3 and VQ4 represent the operation voltages of the switches Q1, Q2, Q3 and 04 respectively. Vx represents the inductor voltage.

FIG. 3A shows the simulation waveforms without implementing the pre-bias voltage control circuit 100. Without pre-biasing, if the capacitor voltage Vc1 starts from 0 V, the voltage stress on switches Q1 and Q4 would be equal to the full 54 V input voltage during the startup transient. This inrush current and voltage stress can potentially damage the switches Q1-Q4, especially switches Q1 and Q4.

On the other hand, FIG. 3B shows the simulation waveforms with implementation of the pre-bias voltage control circuit 100. The capacitor voltage Vc1 is pre-biased to approximately 27 V, which is half of the 54 V input voltage (Vin/2=54 V/2=27 V). Pre-biasing the capacitor voltage Vc1 to half of the input voltage (Vin/2=27 V) limits the voltage stress across the switches Q1-Q4 to approximately 27 V during transient and steady-state operation. This can reduce the risk of damaging the switches. The pre-biasing of the capacitor voltage Vc1 to 27 V is a critical design aspect that helps reduce voltage stress on the switches Q1-Q4, enabling the use of lower voltage-rated devices when the input voltage is high.

Figure 4:
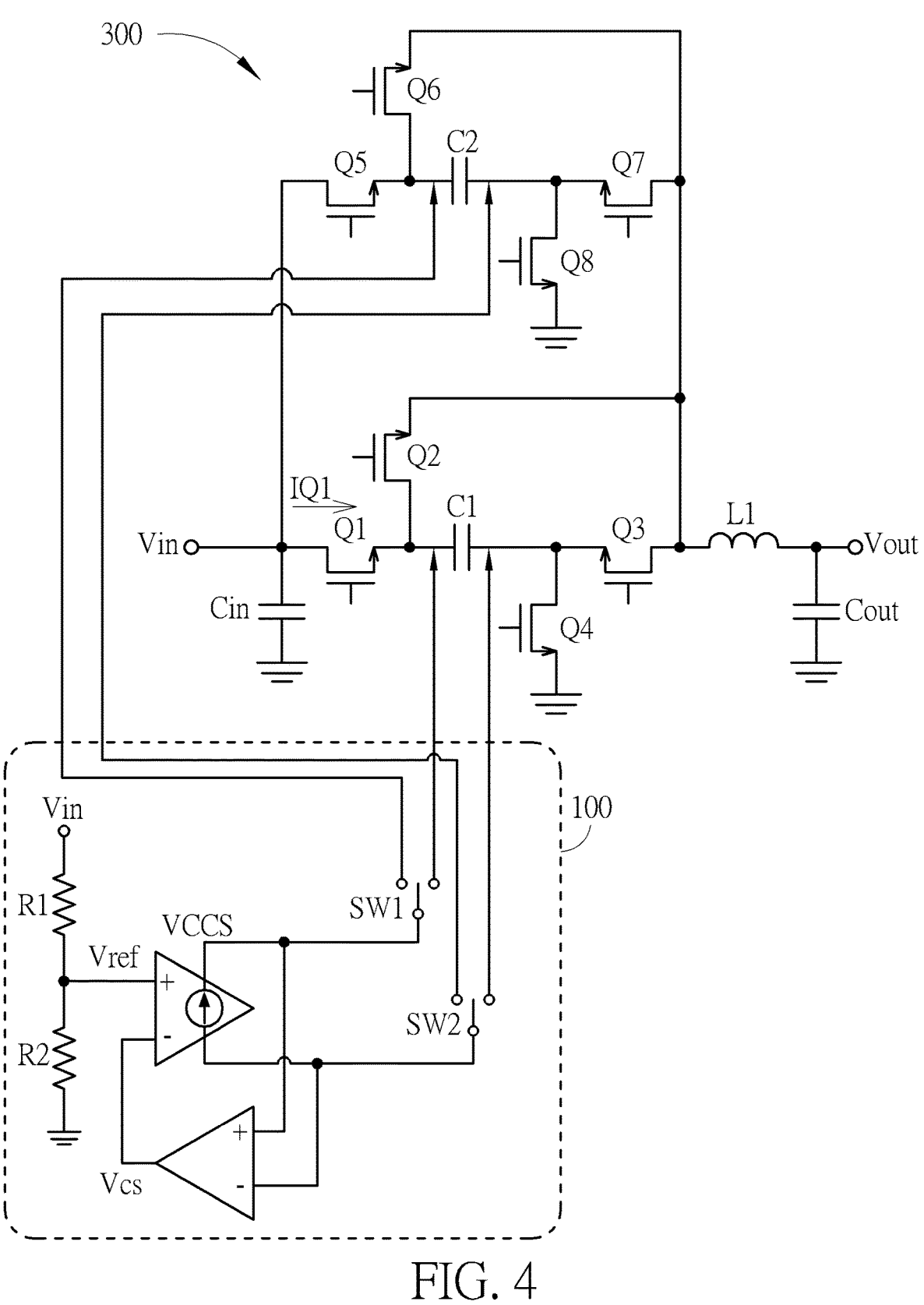
FIG. 4 depicts an application of the pre-bias voltage control circuit of FIG. 1 to another power converter.

FIG. 4 depicts an application of the pre-bias voltage control circuit 100 to a power converter 300. The power converter 300 is similar in architecture to the power converter 200, but includes eight switches Q1-Q8. These switches regulate the power flow to generate the desired output voltage Vout across the output capacitor Cout. An inductor L1 is coupled between the output capacitor Cout and the switches Q1-Q8 to further control the power flow. To minimize voltage stress on the switches, two flying capacitors C1 and C2 are incorporated and configured as voltage dividers. Additionally, a pre-bias voltage control circuit 100 is employed to manage each flying capacitor C1 and C2 independently.

The power converter 300 can be described in further details. An input capacitor Cin can be coupled between an input terminal and the ground. The switch Q1 can be coupled between the flying capacitor C1 and the input capacitor Cin. A first terminal of the switch Q2 can be coupled to the switch Q1 and a second terminal of the switch Q2 can be coupled to the switch Q3. The switch Q3 can be coupled between the inductor L1 and the switch Q4. The switch Q4 can be coupled between the flying capacitor C1 and the ground. The output capacitor Cout can be coupled between the output terminal and the ground. Furthermore, the switch Q5 can be coupled between the input terminal and the flying capacitor C2. A first terminal of the switch Q6 can be coupled to the switch Q5 and a second terminal of the switch Q6 can be coupled to the switch Q7. The switch Q7 can be coupled between the inductor L1 and the switch Q8. The switch Q8 can be coupled between the flying capacitor C2 and the ground. The switches Q1-Q8 can be implemented by suitable transistors.

The pre-bias voltage control circuit 100 manages the flying capacitors C1 and C2. It employs the voltage controlled current source 30 to adjust the charges on the flying capacitors C1 and C2. The voltage controlled current source 30 uses the difference between the reference voltage Vref and the capacitor voltages Vc1 and Vc2 sensed from the flying capacitors C1 and C2 respectively to adjust the charges on the flying capacitor C1 and C2 until the desired voltage is reached.

Figures 5A, 5B:
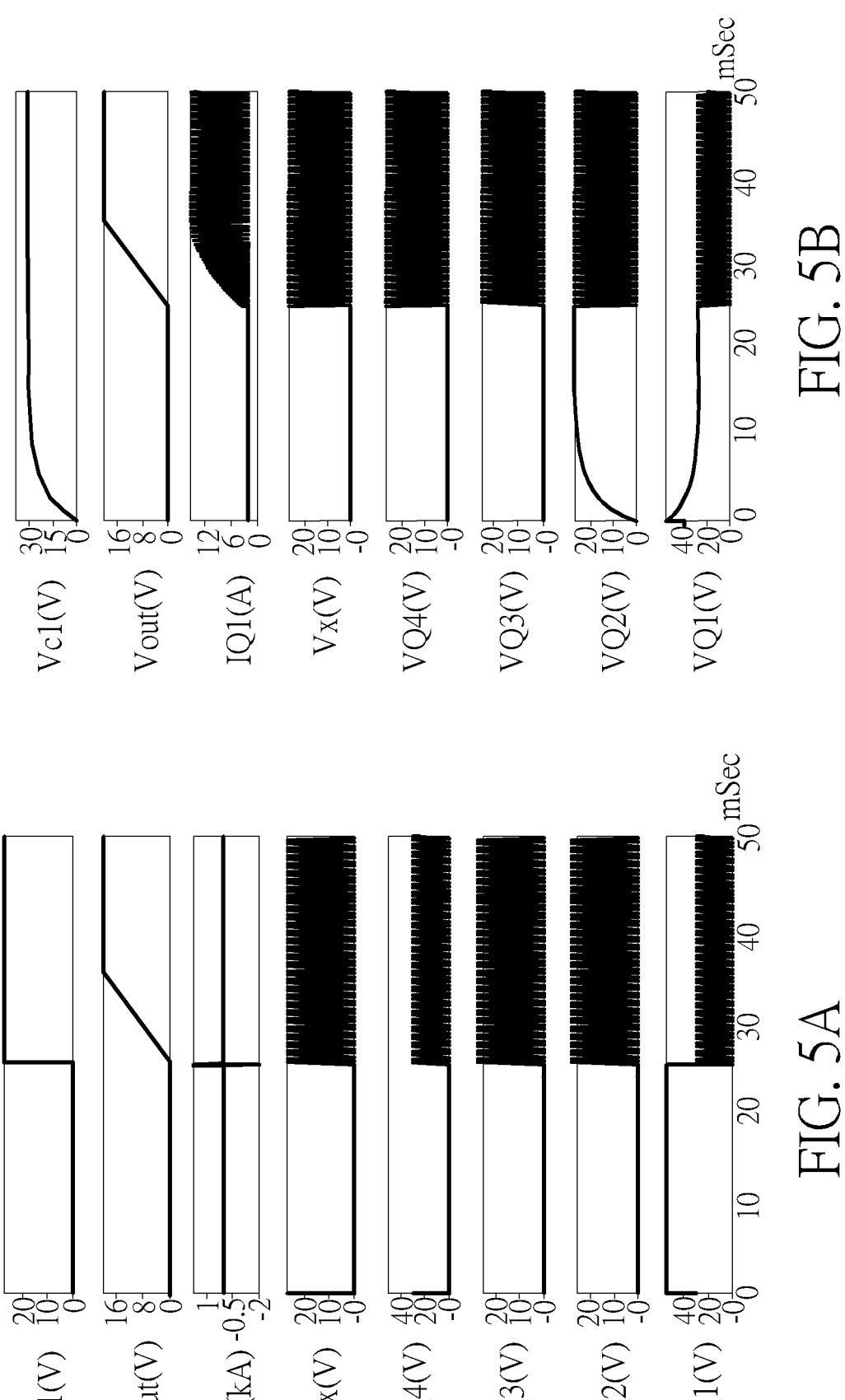
FIG. 5A and FIG. 5B depict simulation waveforms of the various voltages and currents in the power converter of FIG. 4.

FIGS. 5A and 5B depict simulation waveforms of the various voltages and currents in the power converter 300. The vertical axes show voltage values in volts (V) or current values in amps (A). The horizontal axes represent time in milliseconds (ms). The input voltage for the simulation is set at 54 V. Vc1 represents the voltage across the flying capacitor C1. IQ1 represents the operation current of the switch Q1. VQ1, VQ2, VQ3 and VQ4 represent the operation voltages of the switches Q1, Q2, Q3 and Q4 respectively. Vx represents the inductor voltage.

FIG. 5A shows the simulation waveforms without implementing the pre-bias voltage control circuit 100. Without pre-biasing, if the capacitor voltage Vc1 starts from 0 V, the voltage stress on switches Q1 and Q4 would be equal to the full 54 V input voltage during the startup transient. Also as illustrated, the inrush current IQ1 through switch Q1 during startup can surge up to 2 kA, which is much higher than the steady-state current. The inrush current IQ1 and voltage stress can potentially damage the switches Q1-Q4, particularly switches Q1 and Q4 which bear the most voltage stress. The flying capacitor C2 and the switches Q5-Q8 may exhibit substantially similar behaviors. Hence, the description will not be repeated herein for brevity.

On the other hand, FIG. 5B shows the simulation waveforms with implementation of the pre-bias voltage control circuit 100. The capacitor voltage Vc1 is pre-biased to approximately 27 V, which is half of the 54 V input voltage (Vin/2=54 V/2=27 V). Pre-biasing the capacitor voltage Vc1 to half of the input voltage (Vin/2=27 V) limits the voltage stress across the switches Q1-Q4 to approximately 27 V during transient and steady-state operation and eliminates the inrush currents through the switches Q1-Q4. This can reduce the risk of damaging the switches. The pre-biasing of the capacitor voltage Vc1 to 27 V is a critical design aspect that helps reduce voltage stress on the switches Q1-Q4, enabling the use of lower voltage-rated devices when the input voltage is high. The flying capacitor C2 and the switches Q5-Q8 may exhibit substantially similar behaviors. Hence, the description will not be repeated herein for brevity.

Figure 6:
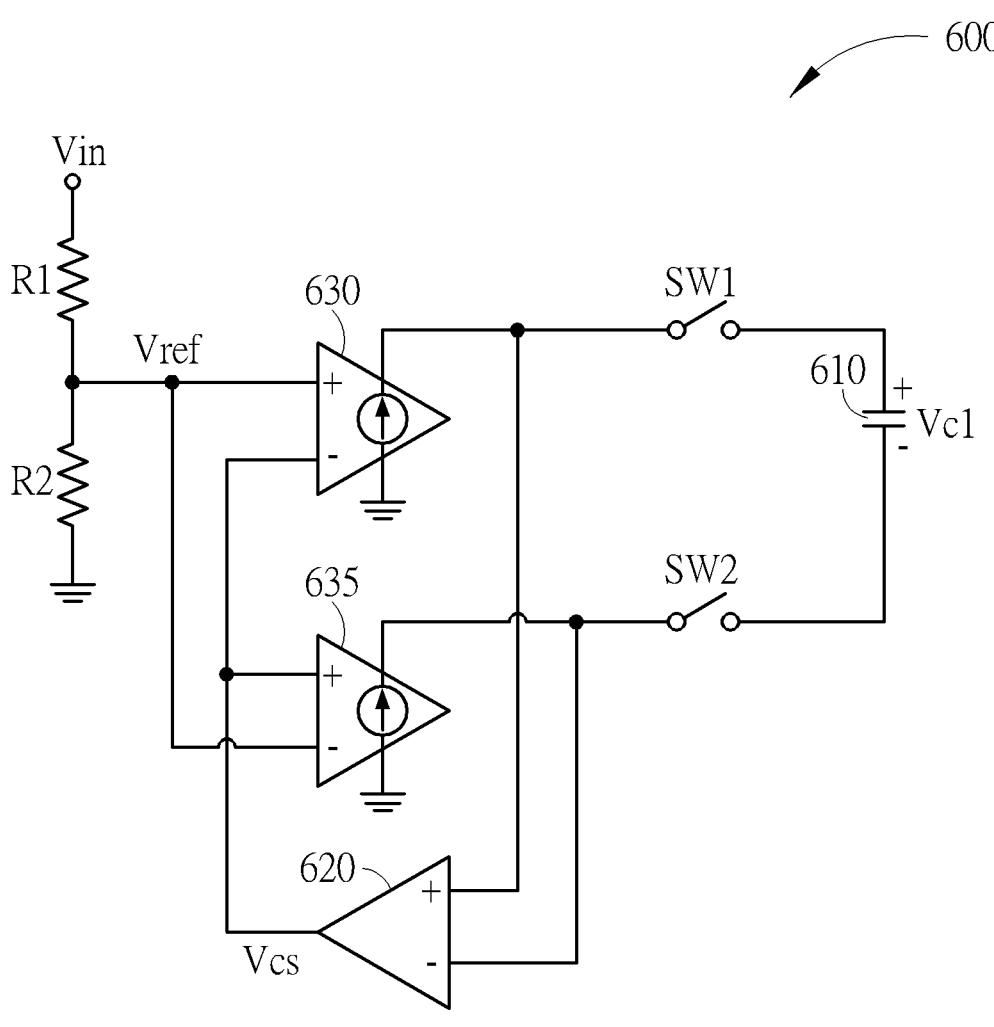
FIG. 6 depicts another embodiment of a pre-bias voltage control circuit.

FIG. 6 depicts an embodiment of a pre-bias voltage control circuit 600. The pre-bias voltage control circuit 600 includes a flying capacitor 610, a voltage sensor 620, and voltage controlled current sources 630 and 635. The voltage sensor 620 is used to generate a sensed capacitor voltage Vcs according to a capacitor voltage Vc across the flying capacitor 610. The voltage sensor 620 includes an inverting input terminal coupled to the one end of flying capacitor 610, a non-inverting input terminal coupled to the other end of the flying capacitor 610, and an output terminal for outputting the sensed capacitor voltage Vcs. The voltage controlled current sources 630 and 635 are used to charge and discharge the flying capacitor 610. The voltage controlled current source 630 includes a reference terminal for receiving a reference voltage Vref, an input terminal coupled to the output terminal of the voltage sensor 620, a current output terminal coupled to the flying capacitor 610, and a current return terminal coupled to the ground. The voltage controlled current source 635 includes a reference terminal for receiving the reference voltage Vref, an input terminal coupled to the output terminal of the voltage sensor 620, a current output terminal coupled to the flying capacitor 610, and a current return terminal coupled to the ground.

Furthermore, the voltage controlled current source 630 generates a current to charge the flying capacitor 610 when the sensed capacitor voltage Vcs falls below the reference voltage Vref. At the same time, the voltage controlled current source 635 generates a current to discharge the flying capacitor 610. The voltage controlled current sources (VCCSs) 630 and 635 operate in an inverse manner to each other.

With two VCCSs 630 and 635, one can be designed to source current (charge the flying capacitor 610) and the other can be designed to sink current (discharge the flying capacitor 610). The VCCSs 630 and 635 can share a single current path but operate in opposite directions based on the control signal. This can potentially improve efficiency compared to using separate current paths for charging and discharging. Furthermore, having two VCCSs 630 and 635 might provide some level of redundancy. If one VCCS malfunctions, the other might still be able to perform the pre-charging function.

The pre-bias voltage control circuit 600 can further include a first switch SW1 coupled between the non-inverting terminal and the flying capacitor 610, and a second switch SW2 coupled between the inverting terminal and the flying capacitor 610. During the pre-charge cycle for the flying capacitor 610, the switches SW1 and SW2 can be activated. Upon completion of the pre-charge cycle (the capacitor voltage Vc reaches the desired pre-bias voltage), the switches SW1 and SW2 can be deactivated.

The pre-bias voltage control circuit 600 can further include a resistive voltage divider, formed by resistors R1 and R2, coupled to the input voltage Vin of a power converter. The resistive voltage divider generates the reference voltage Vref that is a fraction of Vin. By selecting the appropriate resistance ratio of the resistors R1 and R2, the reference voltage Vref can be set to a specific value, such as half of the input voltage Vin.

Figure 7:
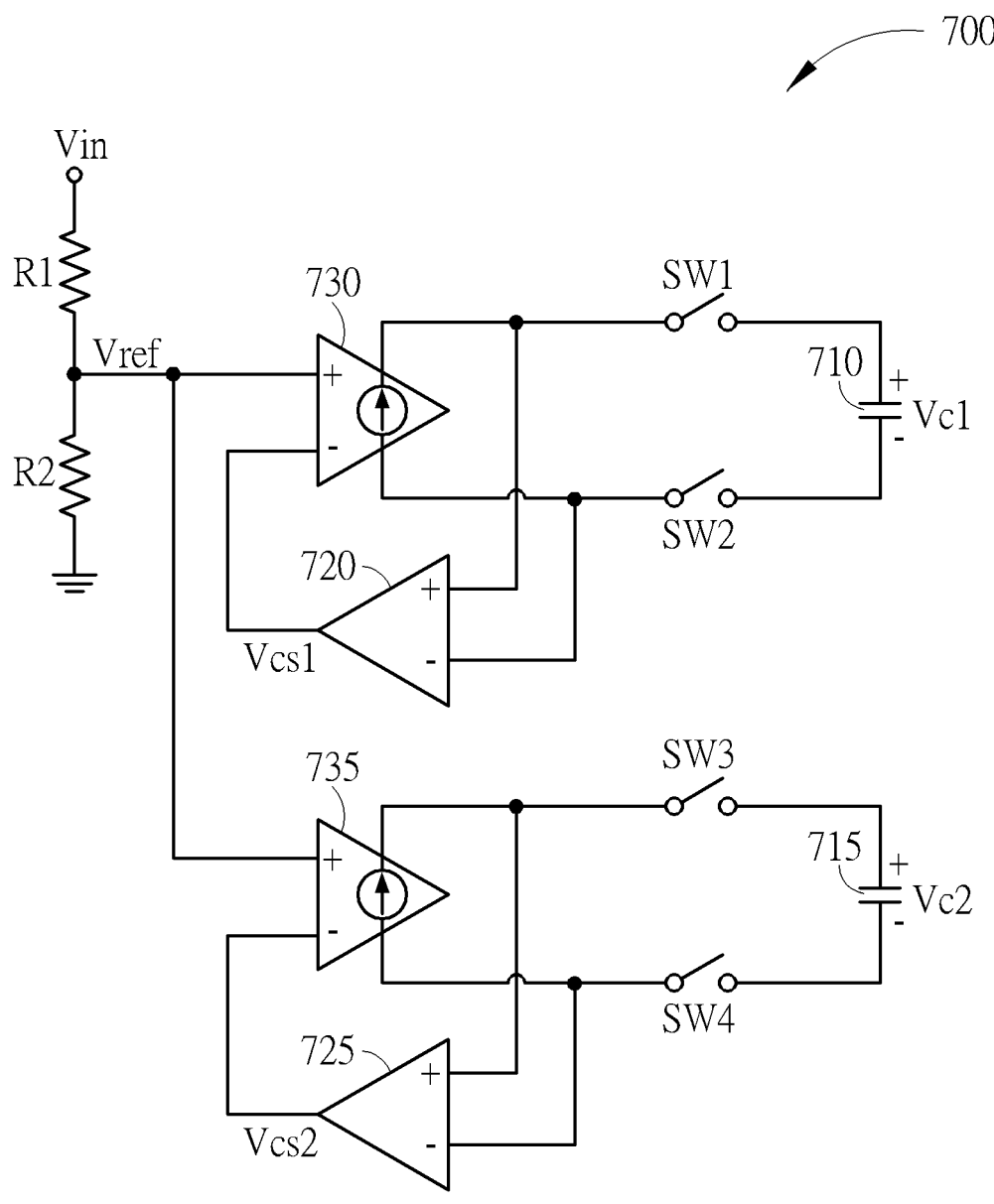
FIG. 7 depicts another embodiment of a pre-bias voltage control circuit.

FIG. 7 depicts an embodiment of a pre-bias voltage control circuit 700. The pre-bias voltage control circuit 700 includes flying capacitors 710 and 715, voltage sensors 720 and 725, and voltage controlled current sources (VCCSs) 730 and 735.

The voltage sensor 720 is used to generate a sensed capacitor voltage Vcs1 according to a capacitor voltage Vc1 across the flying capacitor 710. The voltage sensor 720 includes a non-inverting input terminal coupled to one end of flying capacitor 710, an inverting input terminal coupled to the other end of the flying capacitor 710, and an output terminal for outputting the sensed capacitor voltage Vcs1. The voltage controlled current source 730 is used to charge and discharge the flying capacitor 710. The voltage controlled current source 730 includes a reference terminal for receiving a reference voltage Vref, an input terminal coupled to the output terminal of the voltage sensor 720, a current output terminal coupled to one end of the flying capacitor 710, and a current return terminal coupled to the other end of the flying capacitor 710.

The voltage sensor 725 is used to generate a sensed capacitor voltage Vcs2 according to a capacitor voltage Vc2 across the flying capacitor 715. The voltage sensor 725 includes a non-inverting input terminal coupled to one end of flying capacitor 715, an inverting input terminal coupled to the other end of the flying capacitor 715, and an output terminal for outputting the sensed capacitor voltage Vcs2. The voltage controlled current source 735 is used to charge and discharge the flying capacitor 715. The voltage controlled current source 735 includes a reference terminal for receiving the reference voltage Vref, an input terminal coupled to the output terminal of the voltage sensor 725, a current output terminal coupled to one end of the flying capacitor 715, and a current return terminal coupled to the other end of the flying capacitor 715.

Furthermore, the voltage controlled current source 730 generates a source current to charge the flying capacitor 710 when the sensed capacitor voltage Vcs1 falls below the reference voltage Vref. The voltage controlled current source 730 generates a sink current to discharge the flying capacitor 710 when the sensed capacitor voltage Vcs1 rises above the reference voltage Vref. The voltage controlled current source 735 generates a source current to charge the flying capacitor 715 when the sensed capacitor voltage Vcs2 falls below the reference voltage Vref. The voltage controlled current source 735 generates a sink current to discharge the flying capacitor 715 when the sensed capacitor voltage Vcs2 rises above the reference voltage Vref.

The pre-bias voltage control circuit 700 can further include a first switch SW1 coupled between the non-inverting terminal of the voltage sensor 720 and the flying capacitor 710, and a second switch SW2 coupled between the inverting terminal of the voltage sensor 720 and the flying capacitor 710. During the pre-charge cycle for the flying capacitor 710, the switches SW1 and SW2 can be activated. Upon completion of the pre-charge cycle (the capacitor voltage Vc1 reaches the desired pre-bias voltage), the switches SW1 and SW2 can be deactivated.

Likewise, the pre-bias voltage control circuit 700 can further include a third switch SW3 coupled between the non-inverting terminal of the voltage sensor 725 and the flying capacitor 715, and a fourth switch SW4 coupled between the inverting terminal of the voltage sensor 725 and the flying capacitor 715. During the pre-charge cycle for the flying capacitor 715, the switches SW3 and SW4 can be activated. Upon completion of the pre-charge cycle (the capacitor voltage Vc2 reaches the desired pre-bias voltage), the switches SW3 and SW4 can be deactivated.

The pre-bias voltage control circuit 700 can further include a resistive voltage divider, formed by resistors R1 and R2, coupled to the input voltage Vin of a power converter. The resistive voltage divider generates the reference voltage Vref that is a fraction of Vin. By selecting the appropriate resistance ratio of the resistors R1 and R2, the reference voltage Vref can be set to a specific value, such as half of the input voltage Vin.

The pre-bias voltage control circuit 700 manages the flying capacitors 710 and 715 simultaneously and independently. The control circuit 700 employs two VCCSs 730 and 735 to respectively adjust the charges on the flying capacitors 710 and 715. The VCCS 730 operates based on the difference between the reference voltage Vref and the sensed capacitor voltage Vcs1 sensed from the flying capacitor 710 by the voltage sensor 720. The VCCS 735 operates based on the difference between the reference voltage Vref and the sensed capacitor voltage Vcs2 sensed from the flying capacitor 715 by the voltage sensor 725.

Figure 8:
FIG. 8 depicts another embodiment of a pre-bias voltage control circuit.

FIG. 8 depicts an embodiment of a pre-bias voltage control circuit 800. The pre-bias voltage control circuit 800 includes switches SW1, SW2, SW3 and SW4, a first current source CS1 coupled to the first switch SW1, a second current source CS2 coupled between the second switch SW2 and the ground, a third current source CS3 coupled to the third switch SW3, a fourth current source CS4 coupled between the fourth switch SW4 and the ground, a flying capacitor 810 coupled to the first switch SW1 and the third switch SW3, a voltage sensor 820, a first voltage comparator 830, and a second voltage comparator 840. The voltage sensor 820 may include an operational amplifier, an error amplifier or an equivalent thereof.

The voltage sensor 820 is used to generate a sensed capacitor voltage Vcs according to a capacitor voltage Vc across the flying capacitor 810. The voltage sensor 820 includes an inverting input terminal coupled to one end of the flying capacitor 810, a non-inverting input terminal coupled to the other end of the flying capacitor 810, and an output terminal for outputting the sensed capacitor voltage Vcs. The first voltage comparator 830 is used to compare the sensed capacitor voltage Vcs with a first reference voltage Vref1, and includes an inverting input terminal for receiving the first reference voltage Vref1, a non-inverting input terminal coupled to the output terminal of the voltage sensor 820, and an output terminal coupled to the second switch SW2 and the third switch SW3. The second voltage comparator 840 is used to compare the sensed capacitor voltage Vcs with a second reference voltage Vref2, and includes an inverting input terminal coupled to the output terminal of the voltage sensor 820, a non-inverting input terminal for receiving the second reference voltage Vref2, and an output terminal coupled to the first switch SW1 and the fourth switch SW4.

When the sensed capacitor voltage Vcs rises above the first reference voltage Vref1, the second current source CS2 and the third current source CS3 discharge the flying capacitor 810. The second current source CS2 provides a path for discharging current from the flying capacitor 810 to the ground, while the third current source CS3 pushes current from the capacitor 810 back to the ground.

When the sensed capacitor voltage Vcs falls below the second reference voltage Vref2, the first current source CS1 and the fourth current source CS4 charge the flying capacitor 810. The first current source CS1 provides current from a power supply to charge the flying capacitor 810, while the fourth current source CS4 acts as a path for returning current from the capacitor 810 back to the ground.

When the sensed capacitor voltage reaches a level between the first reference voltage Vref1 and the second reference voltage Vref2, the comparator 830 and the comparator 840 disable all the current sources CS1-CS4. This helps to maintain the flying capacitor 810 voltage at a pre-charged level determined by the reference voltages Vref1 and Vref2.

The pre-bias voltage control circuit 800 can further include a resistive voltage divider formed by resistors R1, R2 and R3, coupled to the input voltage Vin of a power converter. The resistive voltage divider generates the reference voltages Vref1 and Vref2 that are a fraction of Vin. By selecting the appropriate resistance ratio of the resistors R1, R2 and R3, the reference voltages Vref1 and Vref2 can be set to a specific value, such as half of the input voltage Vin, and the first reference voltage Vref1 can be greater than the second reference voltage Vref2.

Overall, the pre-bias voltage control circuit 800 ensures the flying capacitor 810 is pre-charged to a specific voltage range (between Vref1 and Vref2) before the main circuit (e.g., power converter) begins operation.

Figure 9:
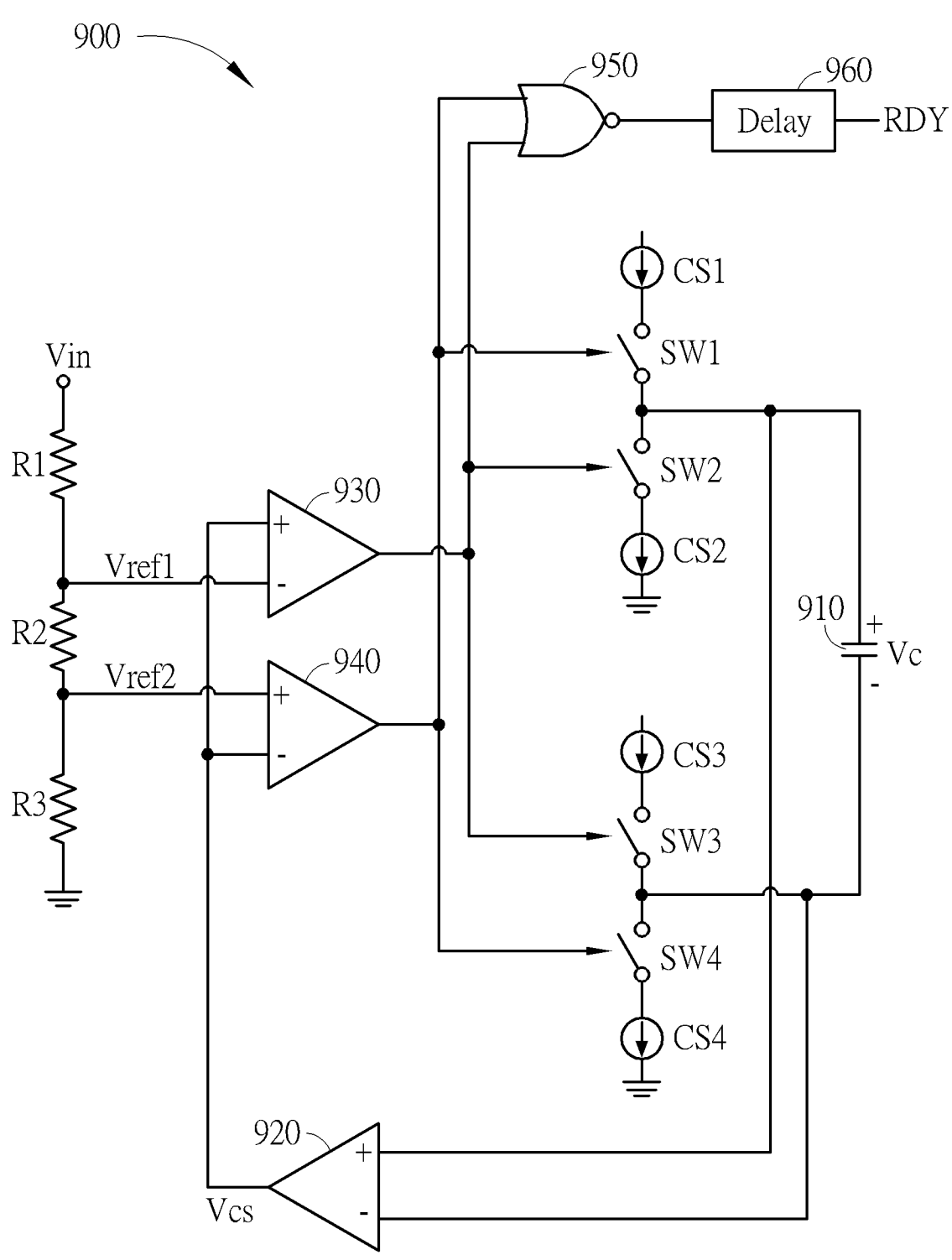
FIG. 9 depicts another embodiment of a pre-bias voltage control circuit.

FIG. 9 depicts an embodiment of a pre-bias voltage control circuit 900. The pre-bias voltage control circuit 900 includes switches SW1, SW2, SW3 and SW4, a first current source CS1 coupled to the first switch SW1, a second current source CS2 coupled between the second switch SW2 and the ground, a third current source CS3 coupled to the third switch SW3, a fourth current source CS4 coupled between the fourth switch SW4 and the ground, a flying capacitor 910 coupled to the first switch SW1 and the third switch SW3, a voltage sensor 920, a voltage comparator 930, and a voltage comparator 940. The voltage sensor 920 may include an operational amplifier, an error amplifier or an equivalent thereof.

The pre-bias voltage control circuit 900 has substantially similar architecture to the pre-bias voltage control circuit 800, except that the pre-bias voltage control circuit 900 further includes an NOR gate 950 coupled to the output terminal of the voltage comparator 930 and the output terminal the voltage comparator 940, and a buffer 960 coupled to the NOR gate 950. The NOR gate 950 with the buffer 960 are used to generate a delayed ready signal RDY.

The NOR gate 950 receives inputs from the voltage comparators 930 and 940 indicating when the flying capacitor 910 reaches the pre-charged voltage range (between reference voltages Vref1 and Vref2). The buffer 960 introduces a controlled time delay after the pre-charge voltage is reached. This delay ensures the flying capacitor 910 has sufficient time to stabilize and the pre-bias control circuit 900 can perform any necessary housekeeping tasks. The delayed ready signal RDY ensures a safe and efficient startup sequence for the main circuit (e.g., power converter) by guaranteeing proper pre-charging and potentially enabling power saving.

Figure 10:
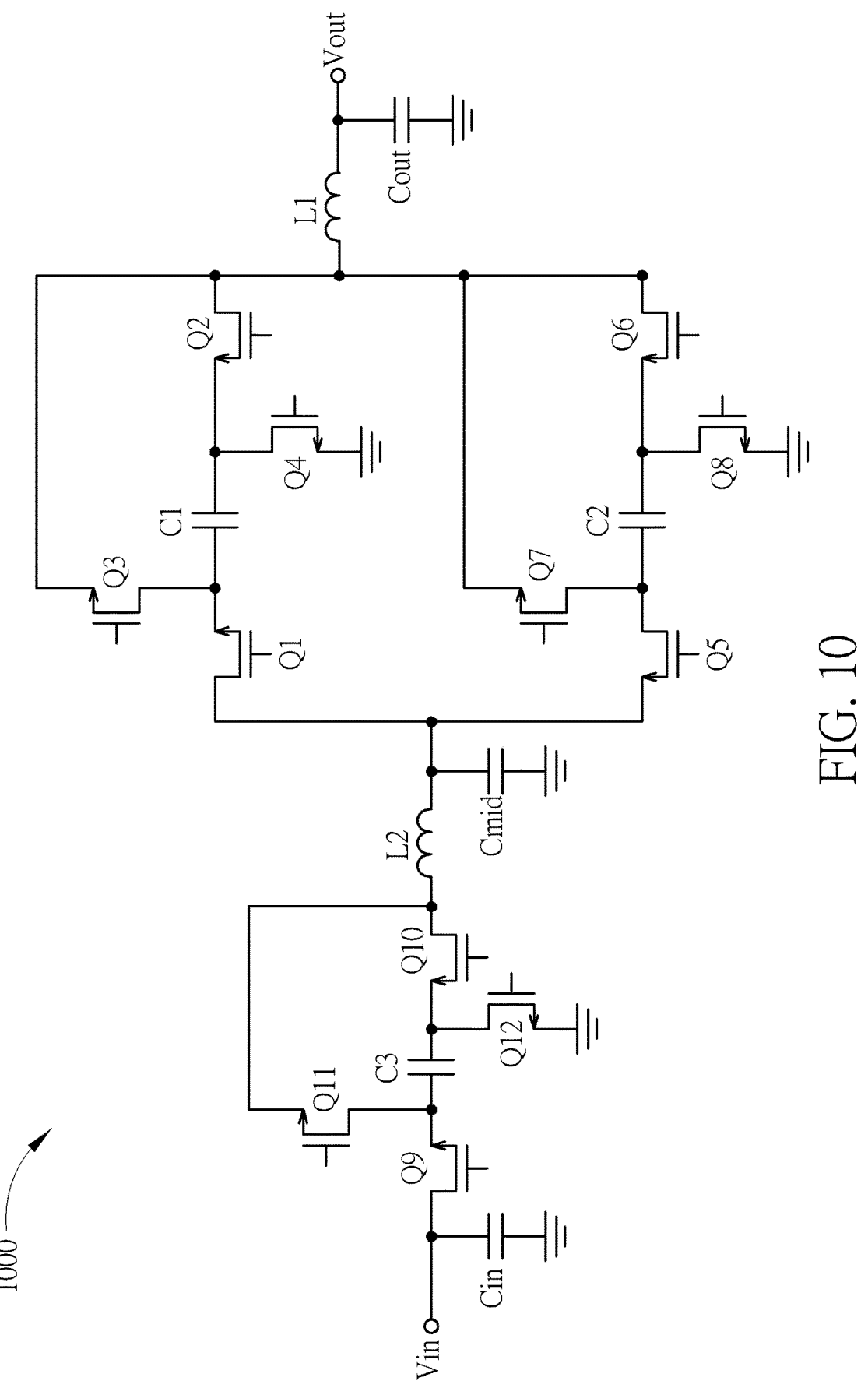
FIG. 10 depicts an embodiment of a cascaded switched-capacitor converter.

FIG. 10 depicts an embodiment of a cascaded switched-capacitor converter 1000, in which the pre-bias voltage control circuit 100 be implemented. The pre-bias voltage control circuit 100 can be coupled to the flying capacitors C1, C2, and C3 in the same manner described in FIG. 4. Hence, the flying capacitors C1, C2, and C3, can be pre-biased to a certain level using the pre-bias voltage control circuit 100 during the pre-charge phase. For example, the flying capacitors C1 and C2 can be charged to Vin/4, and the flying capacitor C3 can be charged to Vin/2.

During the switching phase, the switches coupled to the flying capacitors C1, C2, and C3 are turned on, which transfers the charges stored on the capacitors to the output capacitor Cout, increasing the output voltage Vout. This process is repeated at a high frequency to regulate the output voltage Vout. The cascaded design allows for higher voltage conversion ratios compared to a single-stage switched-capacitor converter. Switches Q1-Q12 can be implemented by suitable transistors. The input capacitor Cin is the input capacitor providing reservoir for input current and reducing input ripples. Inductor L2 and capacitor Cmid are used to couple the stages of the converter. Each stage of the converter 1000 has its own flying capacitors that are pre-charged. The inductor L2 and capacitor Cmid act as a bridge, coupling the voltage from one stage to the next stage. Thus, they help maintain a more consistent voltage throughout the stages.

Figure 11:
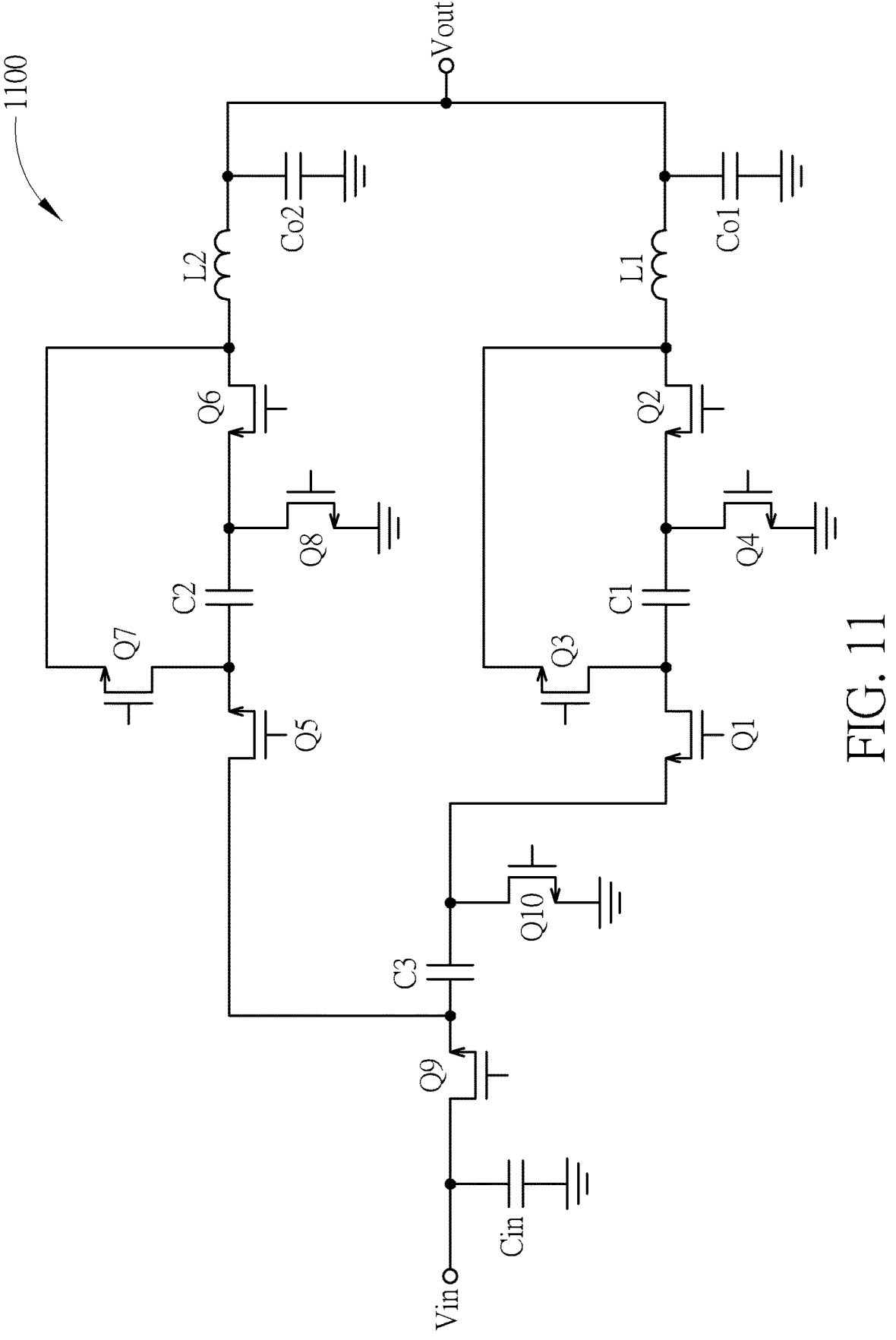
FIG. 11 depicts an embodiment of a pipelined switched-capacitor converter.

FIG. 11 depicts an embodiment of a pipelined switched-capacitor converter 1100, in which the pre-bias voltage control circuit 100 be implemented. The pre-bias voltage control circuit 100 can be coupled to the flying capacitors C1, C2, and C3 in the same manner described in FIG. 4. The pipelined switched-capacitor converter 1100 offer a significant advantage over single-stage designs by enabling simultaneous processing. While the final stage finalizes processing a signal, the initial stages can begin processing the next input signal, leading to a higher conversion rate. The switches Q1-Q10 turn on and off at specific times based on a clock signal to their control terminals, transferring charges between the capacitors and inductors. This mechanism creates a voltage conversion from the input voltage Vin to the output voltage Vout. In this application, the flying capacitors C1, C2, and C3 can be pre-biased to a certain level using the pre-bias voltage control circuit 100 during the pre-charge phase. For example, the flying capacitors C1 and C2 can be charged to Vin/4, and the flying capacitor C3 can be charged to Vin/2. The pre-bias voltage on the flying capacitors C1-C3 contributes to regulating the output voltage, ensuring stability and minimizing distortion in the output signal by mitigating unwanted voltage and/or current spikes.

Figure 12:
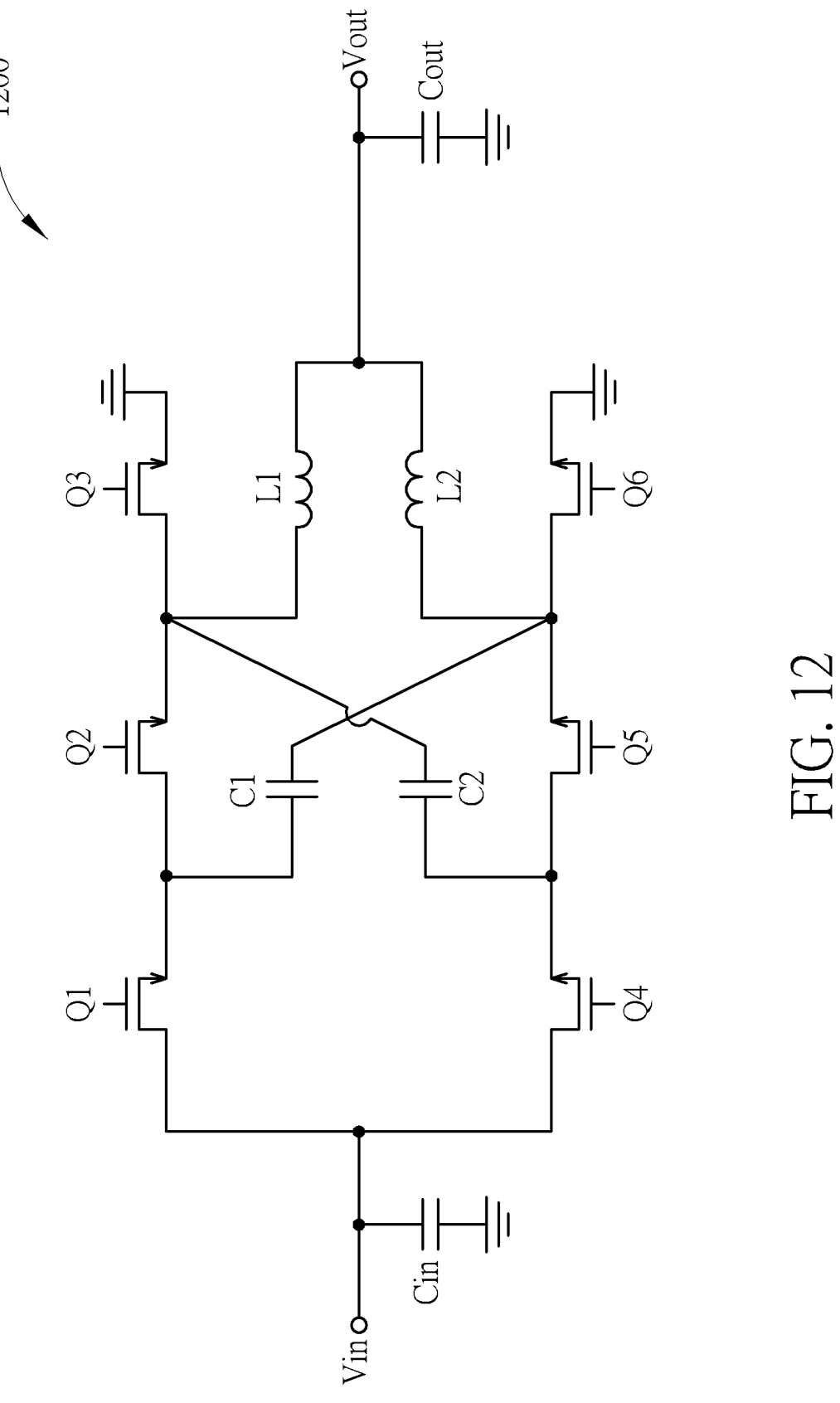
FIG. 12 depicts an embodiment of a cross coupled switched-capacitor converter.

FIG. 12 depicts an embodiment of a cross coupled switched-capacitor converter 1200, in which the pre-bias voltage control circuit 100 be implemented. The converter 1200 includes switches Q1-Q6, flying capacitors C1 and C2, an input capacitor Cin, an output capacitor Cout, inductors L1 and L2. These switches Q1-Q6 are clock signal controlled switches. The pre-bias voltage control circuit 100 can be coupled to the flying capacitors C1 and C2 in the same manner described in FIG. 4.

During the first phase, the switches Q1, Q3 and Q5 are turned on, while others are turned off. This operation connects the capacitor C1 to the input terminal for charging from the input voltage Vin, and also connects the capacitor C1 to the output terminal through the inductor L2 for generating a current to the output terminal so that the output voltage Vout can increase. At the same time, the capacitor C2 discharges its stored energy to the output terminal through the switches Q5 and Q3. During the second phase, the switches Q2, Q4 and Q6 are turned on, while others are turned off. This operation connects the capacitor C2 to the input terminal for charging from the input voltage Vin, and also connects the capacitor C2 to the output terminal for generating a current to the output terminal so that the output voltage Vout can increase. At the same time, the capacitor C1 discharges its stored energy to the output terminal through the switches Q2 and Q6.

The flying capacitors C1 and C2 can be pre-biased to a certain level using the pre-bias voltage control circuit 100 during the pre-charge phase. For example, the flying capacitors C1 and C2 can be charged to Vin/2. The pre-bias voltage on the flying capacitors C1 and C2 contributes to regulating the output voltage, ensuring stability and minimizing distortion in the output signal by mitigating unwanted voltage and/or current spikes.

Figure 13:
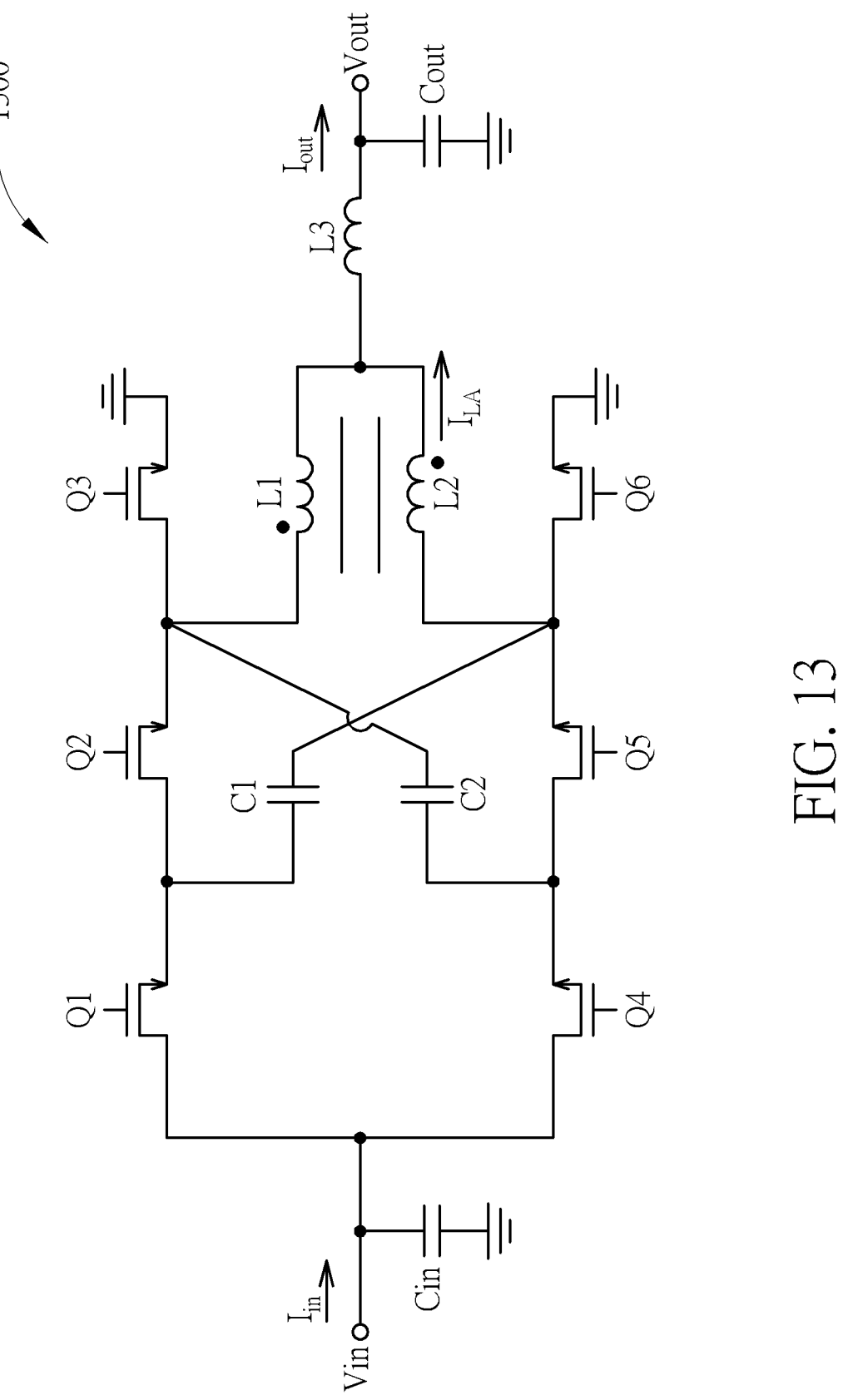
FIG. 13 depicts an embodiment of a cross coupled switched-capacitor converter.

FIG. 13 depicts an embodiment of a cross coupled switched-capacitor converter 1300, in which the pre-bias voltage control circuit 100 be implemented. The architecture of the cross coupled switched-capacitor converter 1300 is substantially similar to that of the cross coupled switched-capacitor converter 1200, but further includes an inductor L3 coupled to the output terminal. The pre-bias voltage control circuit 100 can be coupled to the flying capacitors C1 and C2 in the same manner described in FIG. 4. The flying capacitors C1 and C2 can be pre-biased to a certain level using the pre-bias voltage control circuit 100 during the pre-charge phase. For example, the flying capacitors C1 and C2 can be charged to Vin/2. The pre-bias voltage on the flying capacitors C1 and C2 contributes to regulating the output voltage, ensuring stability and minimizing distortion in the output signal by mitigating unwanted voltage and/or current spikes.

Figures 14A, 14B:
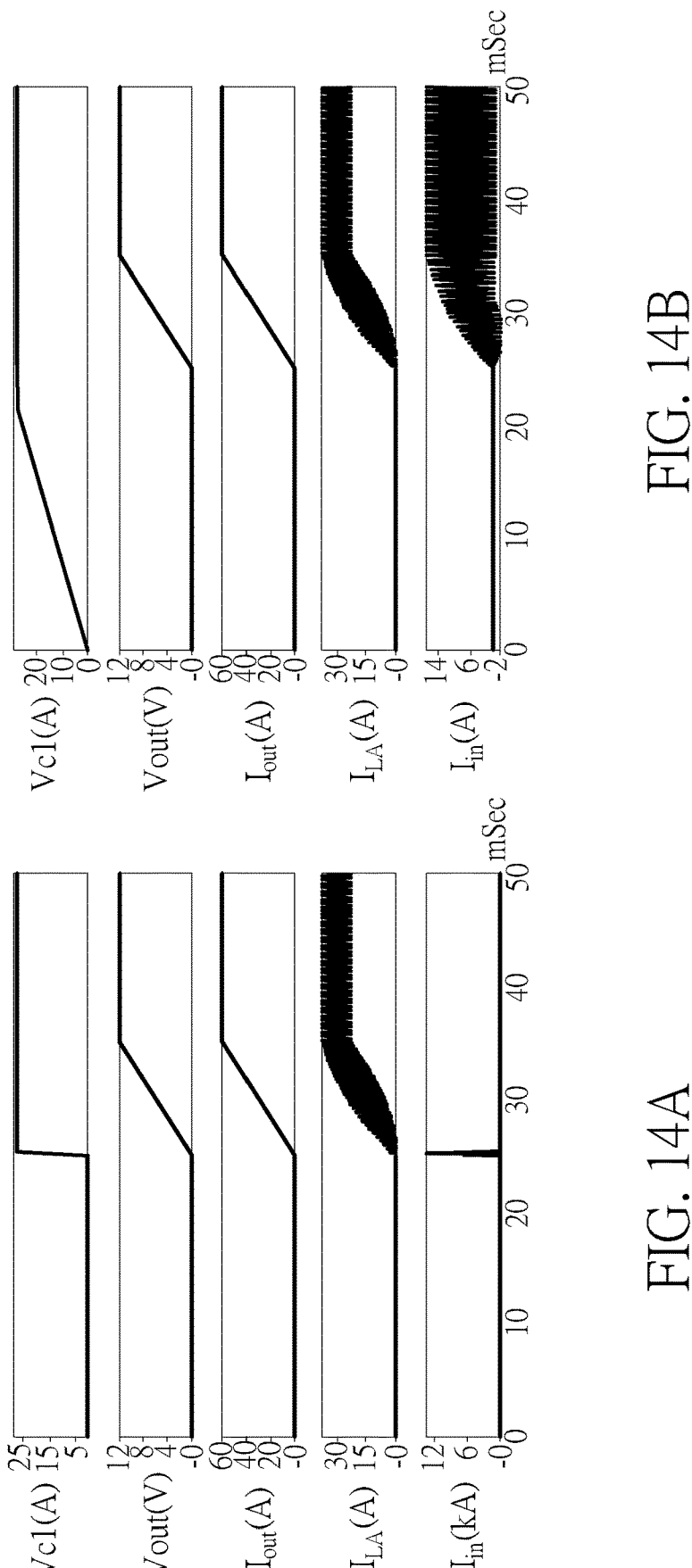
FIG. 14A and FIG. 14B depict simulation waveforms of the various voltages and currents in the cross coupled switched-capacitor converter of FIG. 13.

FIGS. 14A and 14B depict simulation waveforms of the various voltages and currents in the cross coupled switched-capacitor converter 1300. The vertical axes show voltage values in volts (V) or current values in amps (A). The horizontal axes represent time in milliseconds (ms). The input voltage Vin for the simulation is set at 54 V. Vc1 represents the voltage across the flying capacitor C1.

This can potentially damage the switches Q1-Q6. When the flying capacitors C1 and C2 are pre-biased to half of the input voltage (Vin/2=27 V), the inrush current issue during startup period can be eliminated, ensuring stability and minimizing distortion in the circuit operation by mitigating unwanted voltage and/or current spikes.

FIG. 14A shows the simulation waveforms without implementing the pre-bias voltage control circuit 100. When the capacitor voltage Vc1 and Vc2 of the flying capacitors C1 and C2 are without pre-bias before startup, a very high inrush input current $I_{in}$ can occur (up to 12 kA) during startup, which is much higher than the steady-state current. The inrush current $I_{in}$ and voltage stress can potentially damage the switches Q1-Q6.

On the other hand, FIG. 14B shows the simulation waveforms with implementation of the pre-bias voltage control circuit 100. The capacitor voltage Vc1 and Vc2 is pre-biased to approximately 27 V, which is half of the 54 V input voltage (Vin/2=54 V/2=27 V). Pre-biasing the capacitor voltage Vc1 and Vc2 to half of the input voltage (Vin/2=27 V) limits the voltage stress across the switches Q1-Q6 during transient and steady-state operation and eliminates the inrush currents $I_{in}$, ensuring stability and minimizing distortion in the circuit operation by mitigating unwanted voltage and/or current spikes. The pre-biasing of the capacitor voltage Vc1 to 27 V is a critical design aspect that helps reduce voltage stress on the switches Q1-Q6, enabling the use of lower voltage-rated devices when the input voltage is high.

Figure 15:
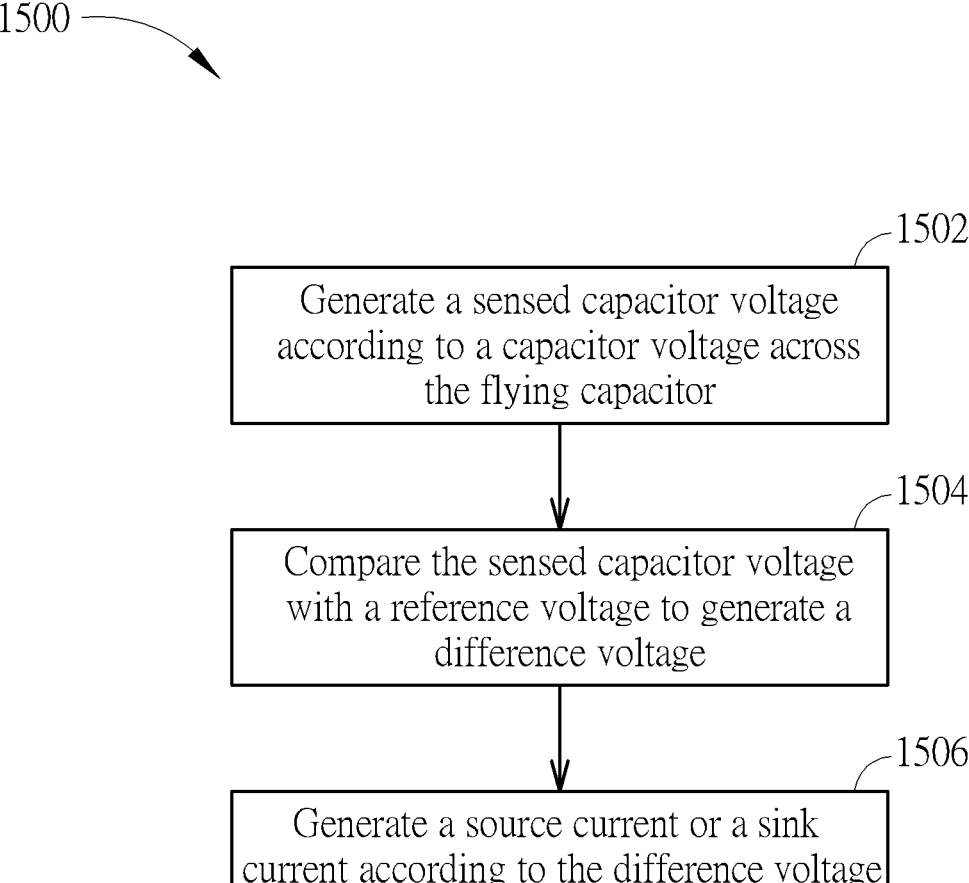
FIG. 15 depicts a flowchart of a method for biasing a flying capacitor using the pre-bias voltage control circuit of FIG. 1.

FIG. 15 depicts a flowchart of a method 1500 for biasing a flying capacitor using the pre-bias voltage control circuit 100. The method 1500 includes the following steps:

S1502: Generate a sensed capacitor voltage Vcs according to a capacitor voltage Vc across the flying capacitor 10;

S1504: Compare the sensed capacitor voltage Vcs with a reference voltage Vref to generate a difference voltage; and S1506: Generate a source current or a sink current according to the difference voltage.

FIG. 16 depicts a flowchart of a method 1600 for biasing a flying capacitor using the pre-bias voltage control circuit 800.

S1602: Generate a sensed capacitor voltage Vcs by a voltage sensor 820 according to a capacitor voltage Vc across the flying capacitor 810;

S1604: Compare the sensed capacitor voltage Vcs with a first reference voltage Vref1 by a first voltage comparator 830;

S1606: Discharge the flying capacitor 810 by a first current source CS1 when the sensed capacitor voltage Vcs rises above the first reference voltage Vref1;

S1608: Compare the sensed capacitor voltage Vcs with a second reference voltage Vref2 by a second voltage comparator 840; and S1610: Charge the flying capacitor 810 by a second current source CS2 when the sensed capacitor voltage Vcs falls below the second reference voltage Vref2.

The above described invention presents a pre-bias voltage control circuit and methodology designed to mitigate the inrush current problem and reduce voltage stress on power switches. An aspect of this invention is the implementation of a pre-bias voltage control mechanism for various power converters or buck converters. The mechanism effectively eliminates inrush current issues and diminishes the voltage stress experienced by power switches during the transient phase. By addressing these challenges, the reliability of the power converter is enhanced, and the use of lower voltage rating devices becomes feasible. Consequently, this invention contributes to improved power converter performance, increased durability, and potential cost savings through the utilization of more economical components.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wire or wireless means) information signals (whether containing voice information or non-voice data/control information) to/from the second entity regardless of the type (analog or digital) of those signals. It is further noted that various figures (including component diagrams) shown and discussed herein are for illustrative purpose only, and are not drawn to scale.

The various illustrative components, logic, logical blocks, modules, circuits, operations and algorithm processes described in connection with the embodiments disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single-chip processor or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, conventional any processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some embodiments, particular processes, operations and methods may be performed by circuitry that is specific to a given function.

As described above, in some aspects embodiments of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the embodiments described in this disclosure may be readily apparent to persons having ordinary skill in the art, and the generic principles defined herein may be applied to other embodiments without departing from the spirit or scope of this disclosure. Thus, the claims are not intended to be limited to the embodiments shown herein, but are to be accorded the widest scope consistent with this disclosure, the principles and the novel features disclosed herein.

While some embodiments comprise the disclosed features and may therefore include additional features not specifically described, other embodiments may be essentially free of or completely free of non-disclosed elements. That is, non-disclosed elements may optionally be essentially omitted or completely omitted.

Additionally, various features that are described in this specification in the context of separate embodiments also can be implemented in combination in a single implementation. Conversely, various features that are described in the context of a single implementation also can be implemented in multiple embodiments separately or in any suitable sub-combination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described should not be understood as requiring such separation in all embodiments, and it should be understood that the described program components and systems can generally be integrated together in a single software or packaged into multiple software. Additionally, other embodiments are within the scope of the following claims. In some cases, the actions recited in the claims can be performed in a different order and still achieve desirable results.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pre-bias voltage control circuit, comprising:
a flying capacitor;
a voltage sensor, configured to generate a sensed capacitor voltage according to a capacitor voltage across the flying capacitor, comprising:
an inverting input terminal coupled to the flying capacitor;
a non-inverting input terminal coupled to the flying capacitor; and
an output terminal for outputting the sensed capacitor voltage; and
a voltage controlled current source, configured to charge and discharge the flying capacitor, comprising:
a reference terminal for receiving a reference voltage;
an input terminal coupled to the output terminal of the voltage sensor;
a current output terminal coupled to the flying capacitor; and
a current return terminal coupled to the flying capacitor;
wherein:
the voltage controlled current source generates a source current to charge the flying capacitor when the sensed capacitor voltage falls below the reference voltage; and
the voltage controlled current source generates a sink current to discharge the flying capacitor when the sensed capacitor voltage rises above the reference voltage.

2. The pre-bias voltage control circuit of claim 1, further comprising:

a first switch coupled between the non-inverting terminal and the flying capacitor; and
a second switch coupled between the inverting terminal and the flying capacitor.

3. The pre-bias voltage control circuit of claim 1, wherein a magnitude of the source current or the sink current is directly proportional to a difference between the sensed capacitor voltage and the reference voltage.

4. The pre-bias voltage control circuit of claim 1, further comprising a resistive voltage divider coupled to the reference terminal, configured to generate the reference voltage according to an input voltage.

5. The pre-bias voltage control circuit of claim 4, wherein the resistive voltage divider comprises:
a first resistor comprising:
a first terminal for receiving the input voltage; and
a second terminal for outputting the reference voltage; and
a second resistor comprising:
a first terminal coupled to the second terminal of the first resistor; and
a second terminal coupled to a ground.

6. The pre-bias voltage control circuit of claim 5, wherein the reference voltage is half of the input voltage.

7. The pre-bias voltage control circuit of claim 1, wherein the voltage sensor comprises an operational amplifier or an error amplifier.

8. A pre-bias voltage control circuit, comprising:
a first switch, a second switch, a third switch and a fourth switch;
a first current source coupled to the first switch;
a second current source coupled between the second switch and a ground;
a third current source coupled to the third switch;
a fourth current source coupled between the fourth switch and the ground;
a flying capacitor coupled to the first switch and the third switch;
a voltage sensor, configured to generate a sensed capacitor voltage according to a capacitor voltage difference across the flying capacitor, comprising:
an inverting input terminal coupled to the flying capacitor;
a non-inverting input terminal coupled to the flying capacitor; and
an output terminal for outputting the sensed capacitor voltage;
a first voltage comparator, configured to compare the sensed capacitor voltage with a first reference voltage, comprising:
an inverting input terminal for receiving the first reference voltage;
a non-inverting input terminal coupled to the output terminal of the voltage sensor; and
an output terminal coupled to the second switch and the third switch; and
a second voltage comparator, configured to compare the sensed capacitor voltage with a second reference voltage, comprising:
an inverting input terminal coupled to the output terminal of the voltage sensor;
a non-inverting input terminal 1 for receiving the second reference voltage; and
an output terminal coupled to the first switch and the fourth switch;
wherein:

when the sensed capacitor voltage rises above the first reference voltage, the second current source and the third current source discharge the flying capacitor;

when the sensed capacitor voltage falls below the second reference voltage, the first current source and the fourth current source charge the flying capacitor; and when the sensed capacitor voltage is between the first reference voltage and the second reference voltage, the first comparator and the second comparator disable the first current source, the second current source, the third current source and the fourth current source.

9. The pre-bias voltage control circuit of claim 8, wherein the voltage sensor comprises an operational amplifier or an error amplifier.

10. The pre-bias voltage control circuit of claim 8, further comprising a NOR gate coupled to the output terminal of the first comparator and the output terminal the second comparator, configured to generate an indication signal according to an output of the first comparator and an output of the second comparator.

11. The pre-bias voltage control circuit of claim 10, further comprising a buffer coupled to the NOR gate.

12. The pre-bias voltage control circuit of claim 8, further comprising a resistive voltage divider coupled to the inverting input terminal of the first comparator and the non-inverting terminal of the second comparator, configured to generate the first reference voltage and the second reference voltage according to an input voltage.

13. The pre-bias voltage control circuit of claim 12, wherein resistive voltage divider comprises:

a first resistor comprising:
a first terminal for receiving the input voltage; and
a second terminal coupled to the inverting input terminal of the first comparator;

a second resistor comprising:
a first terminal coupled to the second terminal of the first resistor; and
a second terminal coupled to the non-inverting terminal of the second comparator; and a third resistor comprising:
a first terminal coupled to the second terminal of the second resistor; and
a second terminal coupled to the ground.

14. The pre-bias voltage control circuit of claim 13, wherein the first reference voltage and the second reference voltage are substantially half of the input voltage, and the first reference voltage rises above the second reference voltage.

15. A method for biasing a flying capacitor using a pre-bias voltage control circuit, the pre-bias voltage control circuit comprising the flying capacitor, a voltage sensor, and a voltage controlled current source, the voltage sensor comprising an inverting input terminal coupled to the flying capacitor, a non-inverting input terminal coupled to the flying capacitor, and an output terminal, the voltage controlled current source comprising a reference terminal, an input terminal coupled to the output terminal of the voltage sensor, a current output terminal coupled to the flying capacitor, and a current return terminal coupled to the flying capacitor, the method comprising:

generating a sensed capacitor voltage according to a capacitor voltage across the flying capacitor;

comparing the sensed capacitor voltage with a reference voltage to generate a difference voltage; and generating a source current or a sink current according to the difference voltage, wherein a magnitude of the source current or the sink current is directly proportional to the difference voltage.

16. The method of claim 15, wherein the pre-bias voltage control circuit further comprises a first switch coupled between the non-inverting terminal and the flying capacitor, and a second switch coupled between the inverting terminal and the flying capacitor, and the method further comprises toggling the first switch and the second switch.

17. The method of claim 15, wherein the pre-bias voltage control circuit further comprises a resistive voltage divider, and the method further comprises providing an input voltage, the reference voltage being half of the input voltage.

18. A method for biasing a flying capacitor, comprising:

generating a sensed capacitor voltage by a voltage sensor according to a capacitor voltage across the flying capacitor;

comparing the sensed capacitor voltage with a first reference voltage by a first voltage comparator;

discharging the flying capacitor by a first current source when the sensed capacitor voltage rises above the first reference voltage;

comparing the sensed capacitor voltage with a second reference voltage; and charging the flying capacitor by a second current source when the sensed capacitor voltage falls below the second reference voltage.

19. The method of claim 18, further comprising:

generating an indication signal when the first current source and the second current source are disabled after a delay time.

20. The method of claim 18, further comprising:

disabling the first current source and the second current source when the sensed capacitor voltage is between the first reference voltage and the second reference voltage, wherein the first reference voltage rises above the second reference voltage.

* * * * *